C. YOUNG.
HOLDING DEVICE FOR ONE-ARMED PERSONS.
APPLICATION FILED SEPT. 20, 1918.

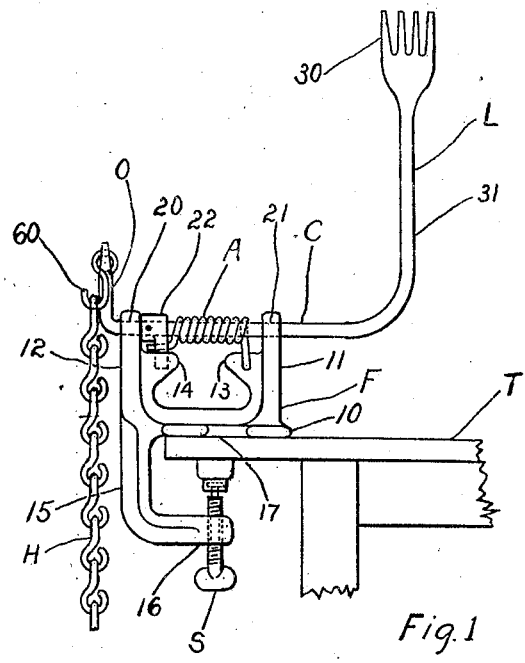

1,343,606.

Patented June 15, 1920.
2 SHEETS—SHEET 2.

INVENTOR.
Charles Young
BY
Gardner W. Pearson
ATTORNEY.

UNITED STATES PATENT OFFICE.

CHARLES YOUNG, OF YORK, MAINE.

HOLDING DEVICE FOR ONE-ARMED PERSONS.

1,343,606.  Specification of Letters Patent.  Patented June 15, 1920.

Application filed September 20, 1918. Serial No. 254,913.

*To all whom it may concern:*

Be it known that I, CHARLES YOUNG, a citizen of the United States, residing at York, in the county of York and State of Maine, have invented certain new and useful Improvements in Holding Devices for One-Armed Persons, of which the following is a specification.

This invention is a device to be used by persons who have temporarily or permanently lost the use of one arm, to assist them in holding articles, such as food or papers, on a table or desk by means of pressure applied through one foot while such articles are being operated on by the other hand.

It is particularly useful as a means for holding meat or other food while it is being cut up by a knife, fork, spoon or other hand utensil held in the other hand.

My device broadly includes a frame attachable proximate the top of an article of furniture, bearings therein, a carrying member revoluble, slidable or otherwise movable in such bearings, a utensil carried thereby in position to engage the top of the article of furniture, an operating member for the carrying member so positioned as to clear the article of furniture, and means operable by the foot connected with the operating member whereby the movements of the utensil toward and from the top of the article of furniture can be controlled by the foot.

My preferred form of device includes a frame which can be clamped to an article of furniture, such as a table, bearings in the frame and a carrying member revoluble therein, together with a utensil so carried by such carrying member that its operative end, such as the tines of a fork, can be brought down on top of the table when it is depressed by means of an operating member. I prefer this operating member should be another arm so fixed to the carrying member as to clear the table and so connected with means, such as a pedal or stirrup, operable by the foot, that it can be lowered at will.

Preferably there is a suitable returning spring and stops and preferably the device is arranged so that various utensils or tools, such as will be described, can be detachably attached thereto.

Figure 4:
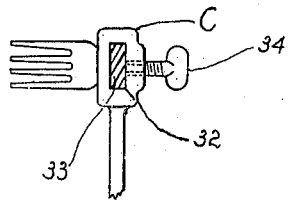
Figure 5:
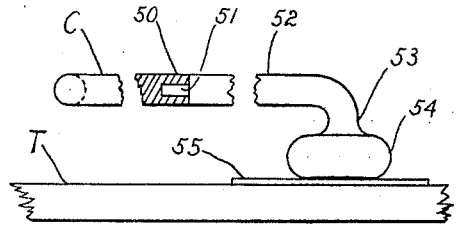
Figure 6:
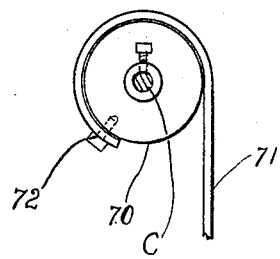
Figure 7:
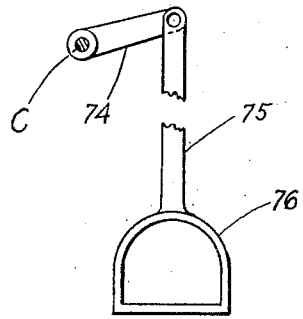
Figure 8:
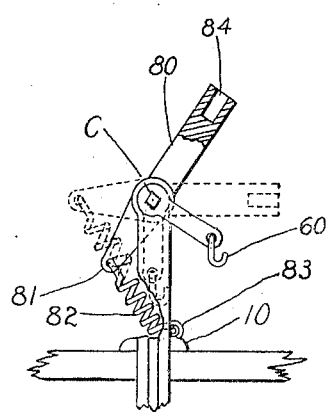
Figure 9:
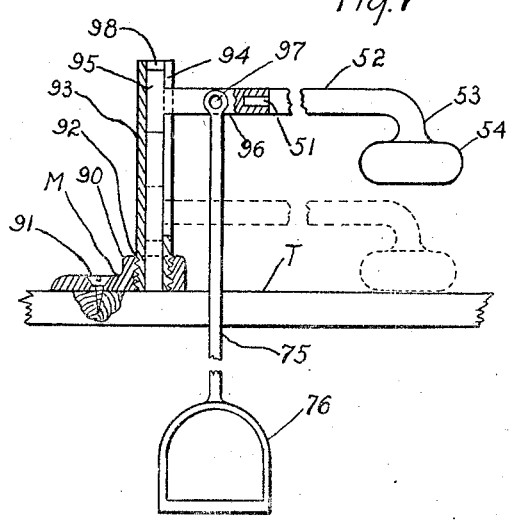

In the drawings, Figure 1 is a side elevation showing my device in the normal position and attached to a table. Fig. 2 is a front elevation showing the parts in the normal or raised position, and Fig. 3 is a front elevation showing the frame with parts in the lowered or holding position. Fig. 4 is a detail showing one method of detachably attaching a utensil, such as a fork. Fig. 5 shows another method of attaching a utensil, such as a paper holder. Fig. 6 is a front elevation showing an alternative form of operating member, and Fig. 7 is a similar view showing foot-operable means whereby a returning spring and stops can be dispensed with. Fig. 8 is a front elevation showing another form of returning spring. Fig. 9 shows a modified form of device.

F represents a frame which includes a base 10 and vertical standards 11 and 12 each of which has, on the side facing the other, a projection 13 or 14. The frame also has an arm which extends downwardly at 15 and inwardly at 16. Through this arm, at 16, extends upwardly a set screw S in such direction as to bear against the bottom 17 of base 10, whereby the frame can readily be attached or detached to an article of furniture, such as a table shown at T.

In the standards 11 and 12, forming part of the frame, are bearings 20 and 21 through which passes a carrying rod C revoluble therein. To this rod C is fixed a nose 22 in such position that it will engage a projection 14 on the standard 12, thus forming a stop whereby the revolution of rod C is limited.

A is a helical returning spring wound around carrying rod C attached at one end to nose 22 and at the other end to the projection 13 on the other standard 11.

L represents a fork or other utensil shown as having tines 30 bent at right angles to its shaft 31 which, in Figs. 1, 2 and 3, is shown as integral with carrying rod C.

As shown in Fig. 4, however, the end of C may be cut out at 32 to receive the shaft 33 of a fork or other utensil, and this shaft may be clamped in position by means of a set screw 34.

As shown in Fig. 5, the end of carrying rod C at 50 may be made with a socket to receive the end 51 of the shaft 52 of a utensil with a neck 53 and a padded head 54 which may be brought down so as to hold in position a piece of paper or other similar article shown at 55.

Whatever utensil is used may be detachably attached to the carrying rod or may be integral therewith.

For an operating member, in Figs. 1, 2 and 3 I show an arm O integral with the carrying rod but which, of course, may be a separate member fixed thereto in any suitable manner. This should be in such position that, when the parts are in their normal position as returned by the spring and the stop, it will point upward and at a slight angle so that, when pulled downward by means of the chain H, it will not be on a dead center.

I prefer to provide a hook, such as 60, at the end of the arm O whereby chain H can be adjusted by passing such hook 60 through a link in such position that the pedal, such as P, will be raised slightly above the floor so that, when pressed by the foot, it, with the chain, will serve as foot operable members to depress member O and the utensil L. This pedal P need not be attached to the floor and preferably has a cleat at 61 across the end opposite from that to which chain H is attached by snap hook 63, so that the foot will not readily slip off.

As shown in Fig. 6, the operating member, instead of being an arm may consist of a pulley 70 fixed on carrying rod C, and instead of a chain I may use a strap, such as 71, fastened at 72 to pulley 70.

For some purposes I may dispense with the spring and stops and may use, fixed to carrying rod C, an arm, such as 74, to the end of which is pivoted a stiff vertical rod 75 carrying at its end a stirrup 76 in such position that the front part of the foot can be inserted to depress or raise. With this construction the utensil is brought down and raised by the movement of the foot and is controlled directly thereby.

In Fig. 8, I show a modification wherein there is fixed to the carrying rod C a holder 80 having a socket 84 suitable for a utensil, such as shown in Fig. 5, such holder extending out in the other direction and having attached at its end 81 a spring 82 which is connected to the end of base 10 at 83 in such manner that it will normally return holder 80 and the utensil carried thereby to the vertical position, as shown by the full lines.

In Fig. 9, I show a front elevation, partly in section, of a modification which may be used in some cases and for some purposes. T represents the table top and M represents a frame which comprises a base consisting of a socket 90 threaded to receive the threaded end 92 of a vertical tube 93 in which is a vertical slot 94. The base and frame are more or less permanently attached or fixed to table T by means of a screw, such as 91.

Vertically movable slidably in channel 98 and a slot 94 therefrom, comprising bearings in frame M, is a carrying member 95, shaped as a piston or plunger, to which is fixed an arm 96 which passes through slot 94. This arm 96 forms a part of the carrying member and is shown as having a socket to receive the end 51 of a paper holding member, including shank 52, neck 53, and head 54.

97 is an operating member shown as a long stud or arm to which is pivoted a rod 75 carrying at the bottom a stirrup 76 in position to be conveniently reached by the foot of the operator. In this construction, the bearings, instead of being adapted for pivotal motion, are of the vertically slidable type, and there are no stops or springs. Besides this, the frame may be regarded as fixed proximate the top of the table T.

I claim:

1. In a holding device for one-armed persons, the combination with a frame comprising a base, vertical standards each formed with a projection and an arm which extends downwardly and inwardly, of a set screw which passes through such arm whereby the frame may be detachably attached to an article of furniture, bearings in the standards, a carrying rod revoluble in such bearings, a nose fixed to the carrying rod in position to engage one of the standard projections, a returning spring wound around the carrying rod attached at one end to the nose and at the other end to the projection on the other standard, a utensil detachably carried at one end of the carrying rod, an operating arm fixed at the other end thereof, a pedal, and an adjustable chain between the pedal and the operating arm.

2. In a holding device for one-armed persons, the combination with a frame, of clamping means for detachably attaching such frame to an article of furniture, bearings in the frame, a carrying member revoluble in such bearings, stops to limit the motion thereof, a utensil carried thereby, an operating member fixed thereto, and means operable by the foot connected with the operating member, together with a returning spring for returning the members to normal position.

3. In a holding device for one-armed persons, the combination with a frame, of clamping means for detachably attaching such frame to an article of furniture, bearings in the frame, a carrying member revoluble in such bearings, a utensil carried thereby, an operating member fixed thereto, and means operable by the foot connected with the operating member, together with a returning spring for returning the members to normal position.

4. In a holding device for one-armed persons, the combination with a frame, of means for detachably attaching such frame to an article of furniture, bearings in the frame, a carrying member revoluble in such bearings, a utensil carried thereby in position to engage the top of the article of furniture, an operating member therefor in position to clear the article of furniture, and means operable by the foot connected with the operating member.

In testimony whereof I have affixed my signature.

CHARLES YOUNG.